(12) United States Patent
Polichar et al.

(10) Patent No.: US 7,372,040 B2
(45) Date of Patent: *May 13, 2008

(54) NEUTRON DETECTOR WITH LAYERED THERMAL-NEUTRON SCINTILLATOR AND DUAL FUNCTION LIGHT GUIDE AND THERMALIZING MEDIA

(75) Inventors: Raulf M. Polichar, San Diego, CA (US); Janis Baltgalvis, La Mesa, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/761,477

(22) Filed: Jun. 12, 2007

(65) Prior Publication Data

US 2007/0228284 A1 Oct. 4, 2007

Related U.S. Application Data

(63) Continuation of application No. 10/822,727, filed on Apr. 13, 2004, now Pat. No. 7,244,947.

(51) Int. Cl.
*G01T 1/24* (2006.01)
(52) U.S. Cl. ................................. 250/390.01
(58) Field of Classification Search ........... 250/390.01, 250/370.05, 367, 370.11, 368
See application file for complete search history.

(56) References Cited

U.S. PATENT DOCUMENTS

| | | | |
|---|---|---|---|
| 2,799,780 A | 7/1957 | Ruderman | |
| 3,288,996 A * | 11/1966 | Monaghan | 250/267 |
| 3,691,378 A * | 9/1972 | Hopkinson et al. | 250/264 |
| 4,942,302 A | 7/1990 | Koechner | |
| 5,078,951 A | 1/1992 | August, Jr. | |
| 5,399,863 A | 3/1995 | Carron et al. | |
| 5,880,471 A | 3/1999 | Schelten et al. | |
| 6,495,837 B2 | 12/2002 | Odom et al. | |
| 6,552,348 B2 | 4/2003 | Cherry et al. | |
| 6,580,079 B1 | 6/2003 | Craig et al. | |
| 6,639,210 B2 | 10/2003 | Odom et al. | |
| 6,727,504 B1 | 4/2004 | Doty | |
| 2002/0175291 A1 | 11/2002 | Reeder et al. | |
| 2004/0104356 A1* | 6/2004 | Bross et al. | 250/486.1 |
| 2005/0023479 A1 | 2/2005 | Grodzins | |
| 2005/0082489 A1* | 4/2005 | August et al. | 250/370.05 |
| 2005/0224720 A1* | 10/2005 | Dai et al. | 250/390.11 |

OTHER PUBLICATIONS

Park, Thermal neutron detection using boron-10 and sodium salicylate doped epoxy films, Jun. 1996, Harvard University, Pages all.*

(Continued)

*Primary Examiner*—David Porta
*Assistant Examiner*—Djura Malevic
(74) *Attorney, Agent, or Firm*—Banner & Witcoff, Ltd.

(57) ABSTRACT

A broad spectrum neutron detector has a thermal neutron sensitive scintillator film interleaved with a hydrogenous thermalizing media. The neutron detector has negligible sensitivity to gamma rays and produces a strong and unambiguous signal for virtually all neutrons that interact with the hydrogenous volume. The interleaving of the layers of thermal neutron sensitive phosphors helps ensure that all parts of the thermalizing volume are highly sensitive.

20 Claims, 3 Drawing Sheets

OTHER PUBLICATIONS

Lithium glass scintillators, Bicron, 1997, two pages.
"BC-704 and BC-705 For Neutron Radiography," Saint-Gobain, Crystals & Detectors, Jun. 2002, two pages.
"Neutron Counting, Detector Applications Information Note," Saint-Gobain, Crystals & Detectors, two pages, Mar. 2003.
"BC-702 Thermal Neutron Detector," Saint-Gobain, Crystals & Detectors, Jun. 2002, two pages.
Yamane, Y., Uritani, A., Isawa, T., Karlsson, J.K.-H., and Pázit, "Measurement of the thermal and fast neutron flux in a research reactor with a Li and Th loaded optical fibre detector," Elsevier Science, 1999, pp. 403-409.
Barton, John C., Hatton, Christopher J., and McMillan, John E., "A novel neutron multiplicity detector using lithium fluoride and zinc sulphide scintillator," Journal of Physics G: Nuclear and Particle Physics, vol. 17, 1991, pp. 1885-1899.

* cited by examiner

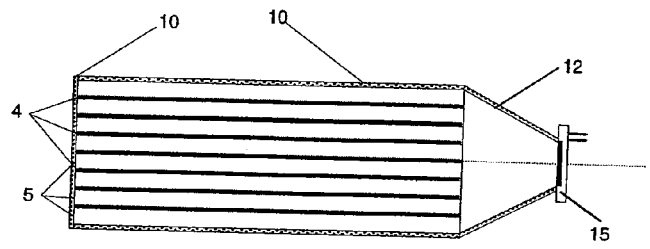
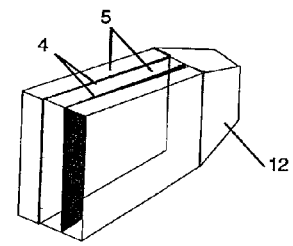
FIG. 1A  FIG. 1B
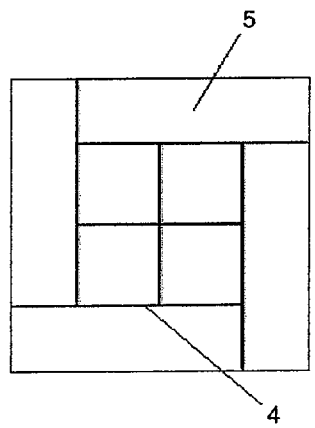
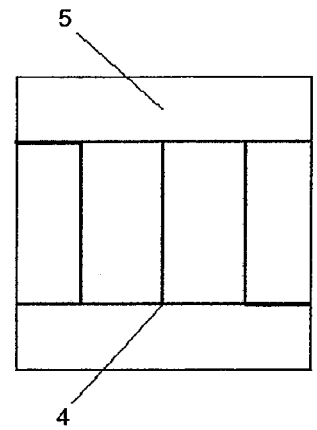
FIG. 1C  FIG. 1D
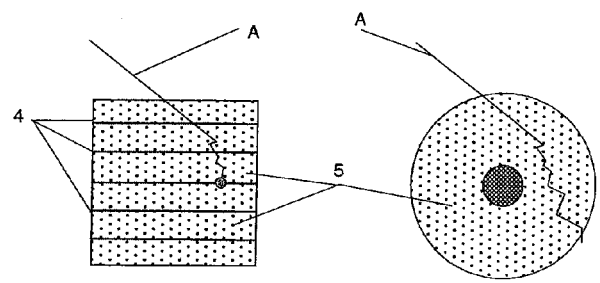
FIG. 2A  FIG. 2B
PRIOR ART

NEUTRON DETECTOR WITH LAYERED THERMAL-NEUTRON SCINTILLATOR AND DUAL FUNCTION LIGHT GUIDE AND THERMALIZING MEDIA

CROSS REFERENCE TO RELATED APPLICATION

This application is a continuation of U.S. application Ser. No. 10/822,727, filed Apr. 13, 2004 now U.S. Pat. No. 7,244,947, the disclosure of which is hereby incorporated by reference.

FIELD OF THE INVENTION

The present invention is directed to neutron detection, particularly in pass-through portal detectors or handheld instruments.

DESCRIPTION OF RELATED ART

There is a great need for a highly efficient sensor to simultaneously detect fission and thermal neutrons that is suitable for inclusion into small instruments currently being used in anti-terrorism applications. The primary technical challenge is to create a detector with minimal volume that still retains a usable absolute sensitivity to the wide energy spectrum of neutrons expected nearby a fission source. The classical approach has usually been to use a hydrogenous thermalizing volume and a discrete thermal neutron detector, such as a $^3$He counter. The term "thermalizing volume" refers to a volume of material that can slow the incoming fission neutron spectrum down to "thermal" velocities. Hydrogenous materials are particularly suitable because of the high probability of inelastic collisions of incoming fast neutrons with hydrogen atoms. These collisions quickly reduce the velocity of the neutrons without excessive absorption by nuclear reactions. Such neutron detectors have significant sensitivity only to neutrons which have been slowed down to thermal energies.

In a conventional $^3$He counter, the volume taken up by the $^3$He counter must be removed at the expense of the thermalizing volume, which significantly reduces the sensitivity to the more energetic portion of the neutron distribution. Using high pressures and thin diameters can help in this situation, but the resulting device still requires a several-kilovolt power supply and takes up a great deal of precious room within a small instrument.

Other technologies using either $^6$Li or $^{10}$B involve the dissolving of the respective atoms uniformly into a plastic or glass scintillator. This scintillator material can be in the form of sheets or as fiber optics. While these approaches have advantages in the simplicity of the materials used, they generally produce much less light per event and require much more gain in the photomultiplier tube (PMT). They generally have increased gamma ray sensitivity and usually require some type of pulse shape analysis to separate gamma from neutron events, making the resulting system more complex. Fiber optic versions of the scintillators may offer improved directionality but suffer from even greater light loss, making detection more difficult. Generally, the cost of fiber optic materials is significantly greater than bulk materials and the blended scintillators are more expensive than a simple ZnS phosphor, which is in common use in displays and CRTs.

It would be desirable to develop an approach which combines the neutron detection and thermalizing volume in a way which maximizes the effective volume of the instrument for all neutron energies while still providing a high detection probability for recording neutron events even in the presence of a high gamma background. The complete system may use a small photo-multiplier tube as the readout or, with proper design and doping, a solid state photo detector as well while still producing a clear and unambiguous neutron signal. With a total solid-state approach, one also eliminates the need for very high voltages and makes the package even more compact.

SUMMARY OF THE INVENTION

According to one aspect of the invention, a neutron detector comprises a thermal-neutron-sensitive scintillator film interleaved with a hydrogenous thermalizing media. The hydrogenous thermalizing media does not scintillate yet substantially reduces the velocity of incoming fission neutrons to thermal energies, without producing light and while still being able to conduct the light produced from the interleaved scintillating layers on to an attached photo-detector. Gamma rays which might ionize in the primary volume of hydrogenous media convert to a recoil electron and lose kinetic energy in the hydrogenous media without the production of light. In the interleaved configuration, neutrons can slow down and scatter many times within the thermalizing volume without being absorbed (except at a scintillator interface). This approach is much more efficient at separating the effects of gamma interactions in a uniformly distributed scintillator in a similar volume.

The interleaving of the layers of neutron sensitive scintillator film helps ensure that substantially all parts of the thermalizing volume are highly sensitive. Neutron sensitive scintillator films useful in the present invention include $^6$Li—ZnS, $^{10}$BN, and other thin layers of materials that release high energy He or H particles in neutron capture reactions. The neutron signal may be many times the gamma signal, with the ability of producing as high as 10,000 or more times rejection of gamma events and a clear electrical distinction separating the neutron pulses at the threshold.

BRIEF DESCRIPTION OF THE DRAWINGS

The present invention will now be described in more detail with reference to preferred embodiments of the invention, given only by way of example, and illustrated in the accompanying drawings in which:

FIGS. 1A-1B show schematic side and partial perspective views, respectively, of a $^6$Li—ZnS "sandwich" detector for fission neutrons in accordance with a preferred embodiment of the present invention;

FIGS. 1C-1D show schematic end views of interleaved configurations in accordance with alternative embodiments of the invention;

FIG. 2A is an end view of the sandwiched $^6$Li detector of FIGS. 1A-1B; FIG. 2B is an end view of a conventional one-quarter inch $^3$He counter;

DETAILED DESCRIPTION OF THE INVENTION

Figure 3:
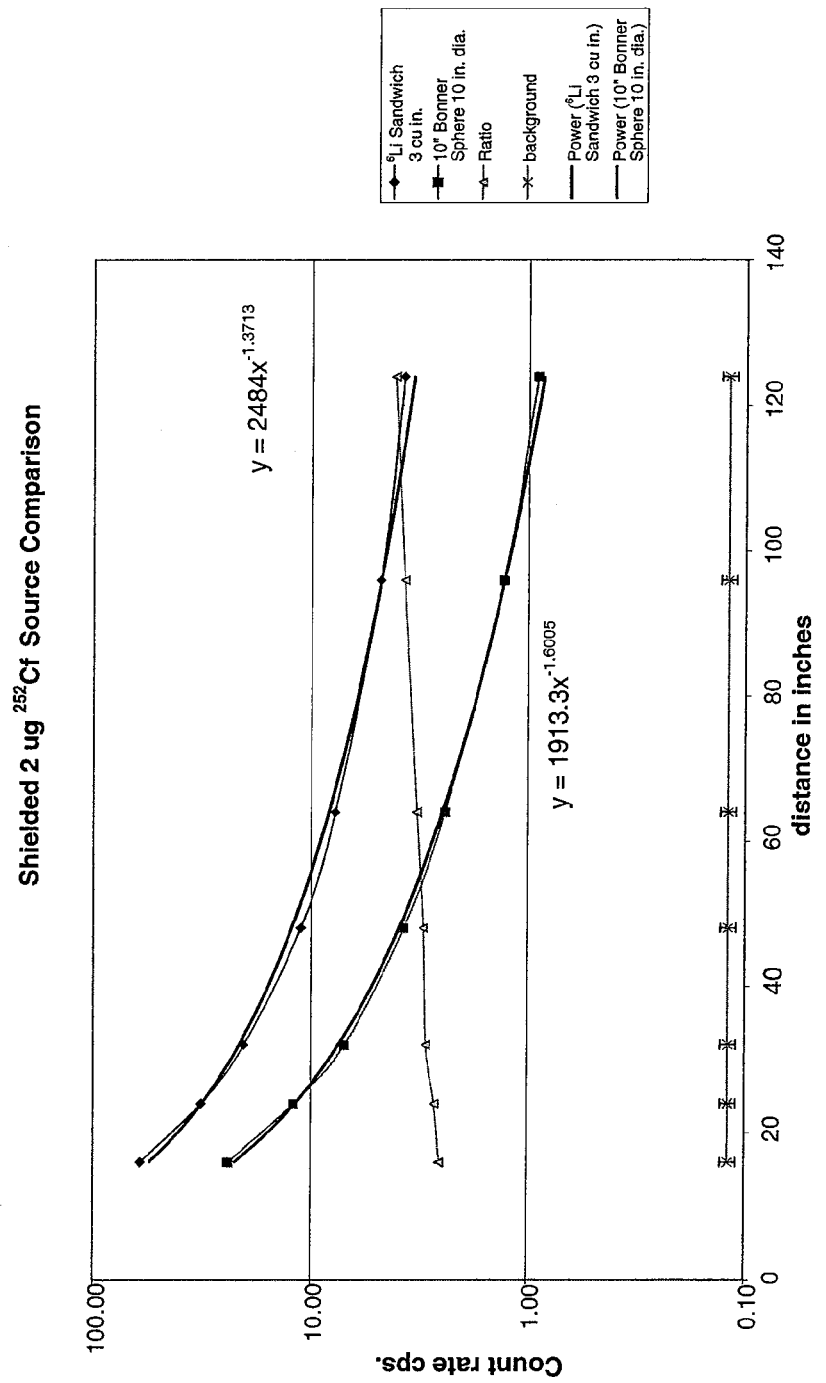
FIG. 3 is a graphical comparison of a 3-cubic inch $^6$Li sandwich detector and a ten-inch diameter Bonner Sphere detector, showing both count rate as well as the ratio between the counters.

The neutron detector of the present invention can be used in a variety of applications, such as pass-through portal detectors, e.g., devices in which a person or object is passed through a relatively large and usually stationary device. In addition, the compact nature of the neutron detector advantageously permits its use in smaller detectors, particularly handheld devices, e.g., portable devices of such dimensions that may enable an operator to handle the device without the need of mechanical assistance.

Thermal neutron sensitive scintillator films useful in the neutron detector include $^6$Li—ZnS, $^{10}$BN, and other thin layers of materials that release high energy He or H particles in neutron capture reactions. In general, the scintillating film has a high concentration of an element having a high probability of thermal neutron absorption with the subsequent emission of an energetic alpha, proton or triton with several MeV of energy. Also, the scintillating film should present a relatively small probability of detecting a gamma ray, and thus a composition of relatively low atomic number is preferred. Such materials can be $^6$Li- or $^{10}$B-enriched ZnS, $^{10}$BN, or other rare earth phosphors that contain Li or B as an additive. Suitable films include those available from St. Gobain (e.g., BC702 film) or Applied Scintillation Technology (e.g., ND scintillating screens).

With reference to the embodiment illustrated in FIG. 1A-1B, a thermal neutron sensitive scintillator film 4 is interleaved with a hydrogenous thermalizing media 5 that can both slow down the fast neutrons as well as transmit the light from the scintillating films 4 to an external photo-sensor 15. Preferred hydrogenous materials have relatively high hydrogen-to-carbon ratios and are not unduly absorptive to the light from the scintillating film. For example, acrylics having a hydrogen-to-carbon ratio of about 1.6:1 are useful. Various suitable hydrogenous materials are commercially available and/or can be readily prepared by persons skilled in the art.

The hydrogenous media generally does not scintillate and can reduce the velocity of incoming fission neutrons to thermal energies substantially without producing light, while still being able to conduct the light from the scintillating layers to a photo-sensor. Gamma rays which might ionize in the primary volume of hydrogenous media can convert to a recoil electron and lose kinetic energy in the hydrogenous media substantially without producing light. Any residual light that might be produced if such an electron did cross the scintillating layer generally is significantly smaller than that from the high energy alpha particle produced within the thin cross-sectional volume of the scintillator itself.

Preferred hydrogenous media materials which have relatively high hydrogen concentrations and are still highly transparent include acrylic and styrene. A wide variety of other polymeric materials, examples of which include polyvinyltoluene (PVT) and polyethylene, can be used provided that the material is sufficiently clear. High density polyethylene (HPDE), when produced by extrusion, tends to be hazy or milky. HDPE is also available as a casting resin, which can be formed into very clear solid shapes that can then be polished or attached to other surfaces. The refractive index of this material is 1.54, which compares with many glasses and may also be formed into a good light guide for transmitting light out an exposed end to a photo-sensor. $^6$Li-doped ZnS can be obtained with either Ag or Cu doping which allows the emitted light to range from 450 to 550 nm average output wavelength in order to match different photosensors.

The basic mode of operation of the neutron detector depends on the $^6$Li neutron capture reaction, which results in a 4.78 MeV alpha particle being produced. Lithium atoms introduced into the ZnS are usually in the form of LiS and enriched to about 95% in $^6$Li. This introduction of enriched $^6$LiS or $^6$LiF into the ZnS permits the phosphors to be very tightly blended. These sulfide phosphors are typical in the form of fine-mesh microcrystals that are settled onto a plate in an organic resin. The film usually is separated from a backing on which it is settled and can be handled as a self-supporting layer. The result is a thin, efficient layer that produces a bright flash for every capture event with an emission wavelength of about 450 nm. As illustrated in FIGS. 2A-2B, once the neutron is slowed down and scattered around in the hydrogenous media 5, the interleaved design (FIG. 2A) provides a much greater probability of the neutron interacting with a $^6$Li-loaded layer 4 than that provided by the coaxial geometry (FIG. 2B) used in conventional $^3$He counters.

Because of the high scintillation efficiency of ZnS and the large energy deposited by the alpha particle, the signal from a neutron event is about 450 times larger than the average energy deposited by a $^{60}$Co gamma ray. This makes simple threshold sensing very practical even in the presence of very large gamma ray backgrounds. $^6$Li—ZnS layers are very thin yet can contain from about 4 to about 11 mg/cm$^2$ of $^6$Li metal. The thickness of the individual $^6$Li—ZnS layers 4 can vary over a wide range but often ranges from about 0.1 to about 0.5 mm. The thickness of the individual hydrogenous media layers 5 also can vary over a wide range, but often ranges from about 0.5 cm to 1.5 cm. It should be understood that these thicknesses are merely exemplary and that actual layer thicknesses may differ significantly from these values.

Typical areal densities of the total phosphor range from about 40 to 70 mg/cm$^2$. This areal density corresponds to a physical thickness of about 400 microns. The actual $^6$Li content is typically about 4-12 mg/cm$^2$ equivalent. With a cross section of 920 barns for the (n,α) reaction, even a single layer is quite efficient for thermal neutrons. Usually, from 1 to 10 layers of scintillator films are used, more often from about 4 to 6 layers.

Thermal neutron-sensing layers 4 are interleaved with layers of hydrogenous thermalizing media 5, which also functions as a light guide. In addition, the layers of hydrogenous thermalizing media 5 may also function as wavelength shifters. This latter function may employ "wavelength shifter" plastics that are capable of absorbing light in the blue region and re-emitting it in the green region, which makes the light more easily detectable by solid-state detectors. Examples of such light-shifter plastics include BC 480, BC 482, and BC 484, all available from St. Gobain. Another advantage of using the interposing plastic layers as wavelength shifters is that it provides a more efficient means of collecting light out the end of the light guide when it enters from normal incidence from the outside.

With reference to the embodiments illustrated in FIGS. 1A-1D, six to seven $^6$Li—ZnS layers 4 are interleaved between seven or eight acrylic layers 5 to maximize the volume of the hydrogenous media 5 and to keep the total volume to a minimum. In this way, neutrons slowed down anywhere in the hydrogenous media 5 can be detected in any of the multiple layers 4 and the light produced piped back to an optical detector 15 located at the end of the device. Light from the end area may be collected down using a taper 12, so that it can be efficiently detected by a small area, back-illuminated Si diode 15 or small photo multiplier tube (PMT). Reflective surfaces 10 surround the outermost layers of the thermalizing media layers 5 and/or scintillator film layers 4. FIG. 2A illustrates an example of the path A of an incoming thermal neutron.

In the embodiments shown in FIGS. 1A-1D, the $^6$Li—ZnS layers 4 and the acrylic layers 5 each have a length of 2.25 inches and a cross-sectional width of 0.25 inches. The thickness of the individual $^6$Li—ZnS layers is approximately 0.015-0.02 inches. The thickness of the individual acrylic layers is 0.2 inches. The alternative interleaved configurations illustrated in FIGS. 1C and 1D provide a more uniform response to neutrons entering from different directions, while using the same amount of $^6$Li—ZnS and acrylic materials.

Some principal design considerations for the neutron detector include: (1) thermal neutron capture; (2) light generation; (3) thermalization (or slowing down) of incoming fission neutrons; and (4) light capture and recording. In addition to the physical operation of the detector, there is the additional issue of identification of non-background neutrons and the overall sensitivity of the system. These are discussed briefly in the following paragraphs.

The primary mechanism for thermal neutron detection is the use of the capture reaction:

$$^6Li + n_t \Rightarrow \alpha + {_2}H = 4.78 \text{ MeV}$$

This reaction has a relatively high cross section of 920 barns. While this is less than the 5500 barns associated with the $^3$He capture reaction normally used for such detectors, it generally is much easier to obtain a higher atomic density with a solid than with a gas. This tends to balance out the sensitivity as well as eliminate the lost volume taken by the gas enclosure from the remainder of the thermalizing volume. This is especially important for small instruments, such as handheld instruments, where space is very restricted.

In the embodiment illustrated in FIGS. 1A-1B, commercially available films 4 of $^6$Li—ZnS in an acrylic binder are sandwiched between acrylic hydrogenous media layers 5, which also serve as a light guide. A typical scintillator film layer 4 contains about 4.5 mg/cm$^2$ of $^6$Li metal equivalent. Using a simple estimate of the projected cross section per unit area, one obtains:

$$\Sigma = \eta(g/cm^2) \times (\text{Å}/A) \times \sigma_a$$

Where: η=Areal density (g/cm$^2$)
Å=Avogadro's number=6.07×10$^{23}$ atoms/gram atomic weight (GAW)
A=Number of grams in a GAW=6
$\sigma_a$=Thermal neutron absorption cross section=920 barns
An estimate for the capture-scintillator layers reveals that the projected cross section per unit area is:

$$\Sigma = 0.41 \text{ cm}^2/\text{cm}^2$$

This projected cross section per unit area is about 40% black to incoming thermal neutrons for every scintillating film. A ZnS phosphor emits about 1.5×10$^5$ blue photons per neutron event. In the embodiments shown in FIGS. 1A-1D, several scintillator layers are interleaved with several layers of hydrogenous media. The probability of detection of a slowed down neutron is very high. Using the light guide as the thermalizing medium allows virtually the entire volume of the detector to be effective in slowing down incoming fast neutrons. Compared with the normal geometry used with a He counter of the same total outside diameter, the neutron detector of the present invention advantageously couples the thermal neutron-sensing portion of the device to the hydrogenous volume that inelastically scatters (and thus slows down) the incoming neutrons. If one compares the typical cross-sectional geometry used in the interleaved neutron detector (see FIG. 2A) to that of a $^3$He tube minus the separate thermalizing volume (FIG. 2B), the projected interaction area of the $^6$Li sensitive layers 4 is much larger for a typical neutron undergoing scattering in the thermalizing volume 5 of the interleaved geometry because of the redundancy of layers 4 in its path, assuming thermalization efficiency for fast neutrons is the same in both detectors.

Because true neutron dose is based on the interactions with tissue, one often tries to simulate a larger volume of near-tissue equivalent mass to allow the incoming spectrum of neutrons to interact therewith and then to relate the total dose to the number of thermal neutrons sampled within this larger volume. The compact neutron detector can also be made more energy independent by increasing the volume of hydrogenous material to that of the thermal neutron sensitive $^6$LiZnS layers or equivalently by making the layers thinner. The trade-off in such optimizations is that the overall sensitivity goes down as the spectral uniformity is increased. This balance can be simulated using Monte Carlo interaction programs. In general, it was found that when compared to a 10 inch diameter Bonner Sphere which was certified up to 14 MeV neutrons, the signals from a $^{256}$Cf neutron source in a 6 inch thick HDPE shield and cadmium metal shield produced about one third of the counts per neutron event as did the compact neutron detector of the present invention. When the source was removed from the shield (increasing the fraction of faster neutrons in the spectrum), the counting rate in the compact neutron sensor was about equal to that of the Bonner Sphere. This suggests that one could improve the energy uniformity by increasing the ratio of hydrogenous material to scintillator material, but probably at the expense of more overall volume or slightly lower counting rate sensitivity.

While the total probability of stopping a thermal neutron can be just as high (per unit area) in the $^3$He tube, the interleaved geometry provides a much higher capture angle for the randomly scattered neutrons while they are slowing though multiple inelastic collisions and approaching thermal energies, and is also more efficient at detecting a thermal event once it is finally slowed down. The incoming neutron path is straight until the first inelastic collision and then tends to be a series of straight-line segments. The neutron will continue to bounce around until it slows down and is converted by the $^6$Li or $^3$He or until it is absorbed by the hydrogen in the thermalizing media. It is readily apparent that the interleaved configuration provides a much larger angle of acceptance to interact with the active element of the detector for virtually any path that the neutron follows as it slows down. Hence, the detector of the present invention is more efficient in actually recording the event. This is especially true for very small volumes, where a $^3$He counter may take up a larger fraction of the overall cross-sectional area. In making the above comparisons, it is assumed that the thermalizing media in both cases had the same hydrogen-to-carbon ratio and atomic hydrogen density.

In an alternative embodiment, a wavelength shifter may be employed to shift blue or UV light to a longer wavelength. These dyes are now sometimes incorporated into plastics and used for special counter geometries in high energy physics. Recent papers have shown that similar dyes can be added to cast plastics while maintaining good optical properties. While the use of wavelength shifting dyes as well as different dopings in the ZnS will optimize both the light collection and wavelength of the detected output signal, the tradeoff is that it will also increase the sensitivity to gamma rays by increasing their signals relative to those of the neutron induced alpha reaction.

Most neutron sensors based on the use of ZnS scintillators have employed photo multiplier tubes that are primarily sensitive to blue light. With the use of Cu doping or with the wavelength shifter dye, it becomes very feasible to use a Si photodiode to read out light making the detector totally solid state and compact. Rather than several kilovolts, one needs only a very low voltage bias (~35-40V), which is much easier to obtain in a handheld instrument. The expected output is equivalent to the midrange signals produced in one current CsI-PIN diode gamma spectrometer, which provides signals 15 times or more above the background noise. It is contemplated that by using photo-sensors at both ends of an elongated detector, one can also provide a convenient geometry to fit into existing portal detectors. Such a detector would have significantly higher sensitivity for detection of shielded sources as compared to an equivalent volume of hydrogenous media and a $He^3$ counter, and would be more cost-effective.

The detector preferably uses a photo multiplier tube (PMT), which is more gain sensitive but its better thermal neutron capture efficiency yields a higher counting rate for the same source strength over the $^3He$ counter.

The background of neutrons in the environment typically is about $0.007$ $sec^{-1}/cm^2$. For a device whose projected area is $10$ $cm^2$ and whose detection efficiency is only 25%, one would expect a counting rate of about 0.0175 events per second from the detector. If one were within 5 m of a 1 kg weapons grade plutonium source, for example, the same detector would be expected to record 0.32 events per second. Such a rate is 18 times background and is relatively easy to detect, even in a short counting period.

FIG. 3 is a graphical comparison of a 3-cubic inch $^6Li$ sandwich detector and a ten-inch diameter Bonner Sphere detector, showing the count rate (cps) for a shielded 2 μg $^{252}Cf$ source. The graph also shows the ratio between the counters. The variations from a constant ratio are due to the large volume of Bonner sphere distorting the $1/r^2$ relationship at close distances.

Figure 4:
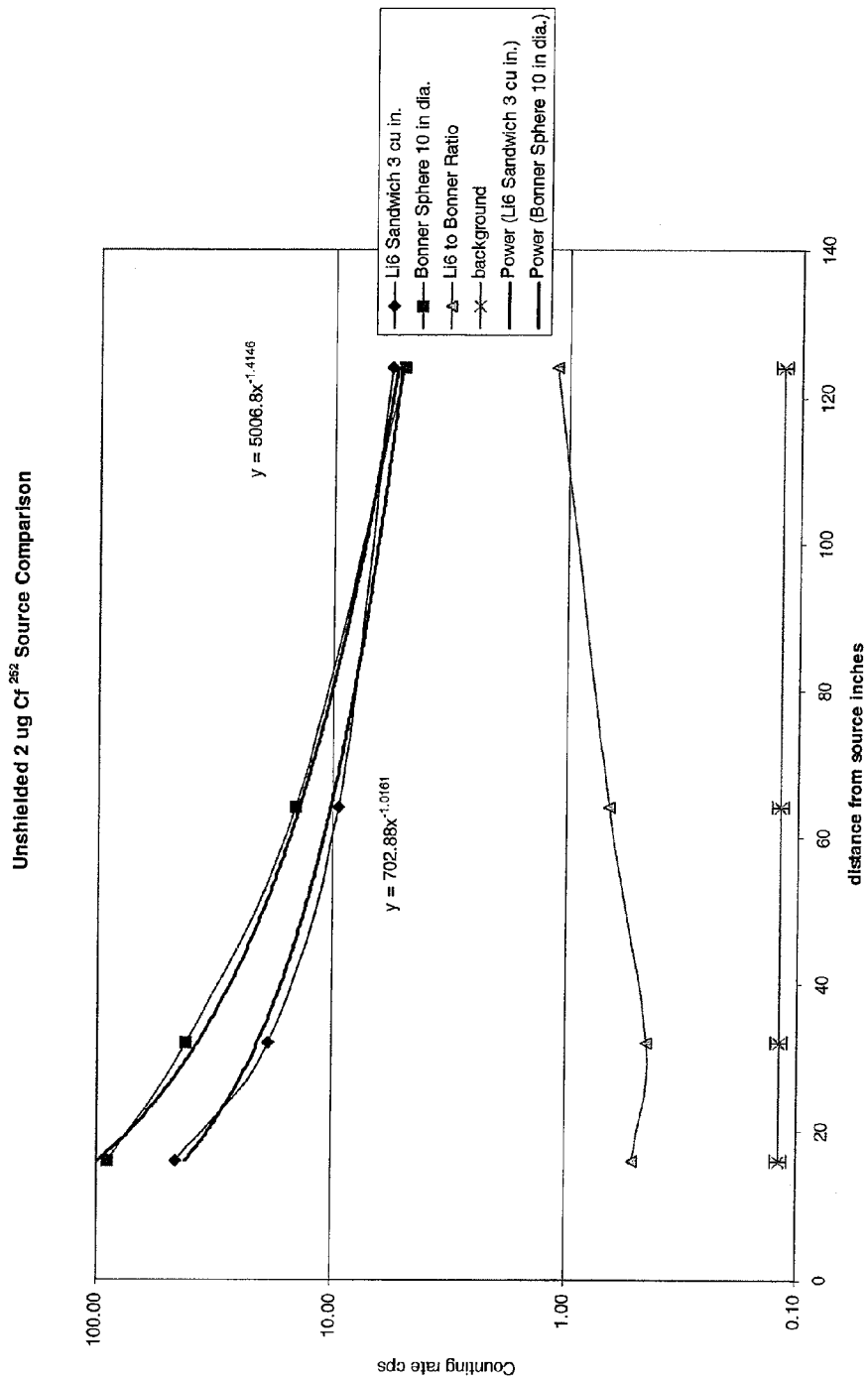
FIG. 4 is a graphical comparison of a $^6$Li sandwich detector and a Bonner Sphere detector for an "unshielded" $^{252}$Cf source.

FIG. 4 is a graphical comparison of a $^6Li$ sandwich detector and a Bonner Sphere detector for an "unshielded" 2 μg $^{252}Cf$ source. As shown in the graph, the ratio degrades but still is generally about 1. The variation is believed to be due to the relative amounts of $^6Li$ and plastic thermalizing media in the sandwich detector.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A broad spectrum neutron detector comprising a thermal neutron sensitive scintillator film having a high concentration of an element which has a high probability of thermal neutron absorption with the subsequent emission of an energetic alpha, proton, or triton with several MeV of energy, interleaved with a hydrogenous thermalizing media having a property of reducing the velocity of incoming fission neutrons to thermal energies substantially without producing light.

2. The neutron detector of claim 1 wherein the thermal neutron sensitive scintillator film comprises a material selected from the group consisting of $^6Li$—ZnS, $^{10}BN$, and other alpha particle sensitive phosphors doped with $^6Li$ or $^{10}B$.

3. The neutron detector of claim 1 wherein the hydrogenous thermalizing media comprises acrylic.

4. The neutron detector of claim 1 wherein the thermal neutron sensitive scintillator film has a layer thickness of about 0.1 mm to about 0.5 mm.

5. The neutron detector of claim 1 wherein the thermalizing media has a layer thickness of about 0.5 cm to about 1.5 cm.

6. The neutron detector of claim 1 further comprising a photo-sensor.

7. The neutron detector of claim 1 further comprising a wavelength shifter.

8. A portal detector comprising the neutron detector of claim 1.

9. A handheld instrument comprising the neutron detector of claim 1.

10. The neutron detector of claim 1 wherein the hydrogenous thermalizing media is selected from the group consisting of polyvinyltoluene, polyethylene, and high density polyethylene.

11. A method of detecting thermal neutrons and fission neutrons comprising passing a person or object through the portal detector of claim 8.

12. A method of detecting thermal neutrons and fission neutrons comprising scanning a person or object using the handheld instrument of claim 9.

13. A neutron detector comprising:
a thermal neutron sensing scintillator comprising at least four thermal neutron sensitive scintillator film layers interleaved with and optically coupled to at least five layers of a light guide-thermalizing media having a property of reducing the velocity of incoming fission neutrons to thermal energies substantially without producing light, wherein the thermal neutron sensitive scintillator film is selected from the group consisting of $^{10}BN$ and other alpha particle sensitive phosphors doped with $^6Li$ or $^{10}B$, and wherein the light guide-thermalizing media is selected from the group consisting of polyvinyltoluene, polyethylene, and high density polyethylene;
a reflecting surface substantially enveloping said interleaved layers, wherein said reflecting surface comprises a tapered portion extending from an end of said interleaved layers for guiding light to a narrowed section; and
a photo-sensor located at the narrowed section of the tapered portion.

14. A portal detector comprising the neutron detector of claim 13.

15. A handheld instrument comprising the neutron detector of claim 13.

16. A method of detecting thermal neutrons and fission neutrons comprising passing a person or object through the portal detector of claim 14.

17. A method of detecting thermal neutrons and fission neutrons comprising scanning a person or object using the handheld instrument of claim 15.

18. A broad spectrum neutron detector comprising means for absorbing thermal neutrons with the subsequent emission of an energetic alpha, proton, or triton with several MeV of energy, interleaved with means for reducing the velocity of incoming fission neutrons to thermal energies substantially without producing light.

19. A portal detector comprising the neutron detector of claim 18.

20. A handheld instrument comprising the neutron detector of claim 18.

* * * * *